United States Patent [19]

Jones et al.

[11] Patent Number: 4,965,621
[45] Date of Patent: Oct. 23, 1990

[54] COMPACT LIGHT COLLIMATOR FOR A SCANNING CONTACT PRINTER

[75] Inventors: Robert S. Jones; John J. Maurer, both of Rochester, N.Y.

[73] Assignee: Eastman Kodak Company, Rochester, N.Y.

[21] Appl. No.: 440,577

[22] Filed: Nov. 17, 1989

[51] Int. Cl.⁵ ............ G03B 27/00; G03B 27/10; G02B 6/00

[52] U.S. Cl. ................... 355/1; 350/96.28; 355/71; 355/84

[58] Field of Search ........... 355/1, 80, 67, 71, 81, 355/84, 101, 113; 350/345, 432, 96.28

[56] References Cited

U.S. PATENT DOCUMENTS

| | | | |
|---|---|---|---|
| 2,198,115 | 4/1940 | John | 355/1 |
| 3,163,080 | 12/1964 | Miller | 355/1 |
| 3,183,815 | 5/1965 | Kapany et al. | 355/1 X |
| 3,277,306 | 10/1966 | Blankenship | 355/1 X |
| 3,514,200 | 5/1970 | Bowker | 350/96.28 X |
| 4,043,653 | 8/1977 | Croce et al. | 355/80 X |
| 4,158,222 | 6/1979 | Cook | 350/432 X |
| 4,265,532 | 5/1981 | McIntosh | 355/68 X |
| 4,576,435 | 3/1986 | Nishioka | 350/96.28 X |
| 4,765,718 | 8/1988 | Henkes | 350/345 |

*Primary Examiner*—Richard A. Wintercorn
*Attorney, Agent, or Firm*—Robert L. Randall

[57] ABSTRACT

In a contact printer comprising means for supporting a film and an original in superposed relationship, means for providing a source of light for exposing the film through the original, and means for moving the light over the surface of the superposed film and original. The improvement comprises means carried by the light moving means for collimating the light, with the light collimating means comprising a plurality of parallel tubular members having a length to diameter ratio greater than about four and which extend between the light source and the film.

16 Claims, 3 Drawing Sheets

COMPACT LIGHT COLLIMATOR FOR A SCANNING CONTACT PRINTER

RELATED APPLICATIONS

The present application is related to our co-pending applications entitled A CONTACT PRINTER FOR EXPOSING SENSITIZED GRAPHIC ART FILE AND PAPER, Ser. No. 438,565, now U.S. Pat. No. 4,949,122 A METHOD OF EXPOSING SENSITIZED GRAPHIC ART FILM AND PAPER, Serial No. 438,564, A COMPACT CONTACT PRINTER WITH A FLEXIBLE TRANSPARENT COVER SHEET, Serial No. 438,822, now U.S. Pat. No. 4,962,405 A REMOVABLE COVER SHEET ROLL FOR A CONTACT PRINTER, Ser. No. 438,567 now U.S. Pat. No. 4,952,973, and COVER SHEET CLEANSING MEANS FOR A CONTACT printer, Ser. No. 440,576, now U.S. Pat. No. 4,942,426 all filed on even date herewith.

BACKGROUND OF THE INVENTION

Contact printing or exposure is a traditional graphic arts procedure for generating same size, high resolution reproductions of line and halftone film images. This technique ensures faithful original film image reproduction by placing the original film image in intimate contact with a receiving film or paper emulsion and, in the presence of a vacuum to hold them in intimate contact throughout the exposing process, exposing through the original film image to the receiving film or paper by means of a point or reflected light source. Typically, these images are of a relatively large size in order to meet the needs of the graphic arts industry and thus require large format originals and receiving films and the equipment necessary to handle such sized films.

Traditional silver halide contact films have sufficient photographic visible light sensitivity that the contacting exposure can be carried out with a simple, low cost, low energy tungsten light source. However, because of the sensitivity of these films to visible light, the contact exposure must be carried out in a darkroom environment. This causes a major inconvenience for the operator and results in a loss of productivity in the graphic arts production process.

In an attempt to improve graphic arts contact exposure productivity, film manufacturers have developed normal roomlight handling contact films. These films are photographically very insensitive to visible light, but have a relatively high UV sensitivity (although, in fact, having a relatively low UV sensitivity compared to the UV sensitivities of darkroom-handled film). These roomlight-handled films have improved the productivity of graphic arts contact exposure operations by eliminating the bottlenecks of the darkroom environment. However, they have also increased the use of high intensity, expensive, high UV output light sources. Metal halide light sources are a common type of UV light source used to expose these films.

One of the most important aspects of the graphic arts contact exposing or printing process is the need for accurately reproducing very fine lines and halftone dots. This has resulted in the requirement that the exposing light be collimated at the exposing plane so that such lines and dots can be reproduced accurately without undercutting or spreading and changing the size of the reproduced line or dot and the resulting image. Adequate light collimation has been achieved in the past by using a point light source mounted at a sufficiently great distance from the exposing plane that the light is substantially collimated by the time it reaches the exposure plane.

Given the large exposing plane area necessary for graphic arts purposes, the need for a high degree of light collimation to achieve accurate image reproduction, and the relative low photographic UV sensitivities of roomlight handling contact films, a high energy, expensive metal halide source has heretofore been required to expose these films. These high intensity UV light sources have required that the operator be shielded from the light source to avoid exposure to harmful UV radiation. Examples of such arrangements are illustrated in U.S. Pat. Nos. 4,029,404, 4,316,669, and 4,437,759. As a result, the total volume of space required for the graphic arts contact exposing set-ups of the prior art has been large and, since most printing shops have more than one of these exposing set-ups, the total volume of space required is significant. Attempts at reducing the space and volume of contact printers have not been altogether successful. Optical collimators have been found to be costly to design and manufacture, and also provide significant losses in the luminance available at the exposure plane, requiring either larger, more expensive light sources, or longer exposure times.

Thus, the provision of a compact, simple and inexpensive light collimator which could be used in a contact printer to provide a compact size, the reproduction accuracy necessary for graphic arts images, and the desired productivity, would find ready acceptance in the graphic arts industry.

SUMMARY OF THE INVENTION

Accordingly, the present invention provides an improvement in a contact printer comprising means for supporting a film and an original in superposed relationship, means for providing a source of light for exposing the film through the original, and means for moving the light over the surface of the superposed film and original. The improvement comprises means carried by the light moving means for collimating the light, with the light collimating means comprising a plurality of parallel tubular members having a length to diameter ratio greater than about four and which extend between the light source and the film.

Further, the present invention provides an improvement in a contact printer which includes vacuum table means for supporting a photosensitive film and an original containing an image to be reproduced in superposed relationship, light means for providing an elongated beam of photoactive light for exposing said film through said original, means for moving the light means transversely of the length of the beam over the vacuum table surface over the superposed film and original whereby the superposed film and original are scanned by the light so that the light exposes the film through the original. The improvement comprises means carried by the light moving means for collimating the light from the light means. The light collimating means comprises a plurality of parallel tubular members having a length to diameter ratio greater than about four and extending between the light source and the film. The tubular members are arranged with the axes thereof disposed substantially perpendicular with the film and the light source. The tubular members have a substantially hexagonal cross section and a light absorptive inner surface whereby unorganized light introduced into one end thereof leaves the opposite end substantially collimated.

Various means for practicing the invention and other features and advantages thereof will be apparent from the following detailed description of an illustrative preferred embodiment of the invention, reference being made to the accompanying drawings.

DESCRIPTION OF THE PREFERRED EMBODIMENT

Figure 1:
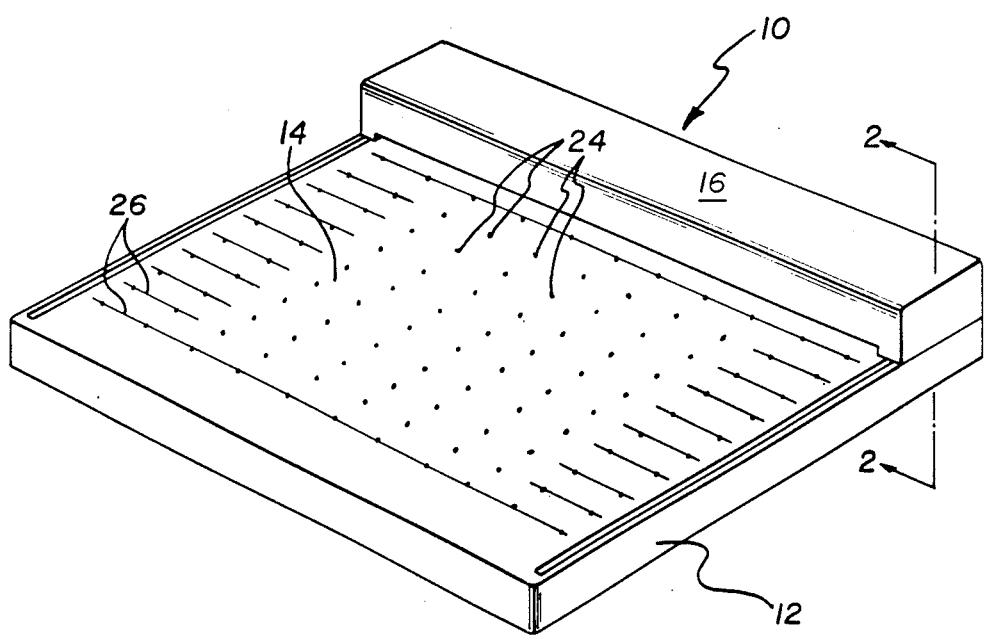
FIG. 1 is a perspective view of a preferred embodiment of the present invention.
Figure 2:
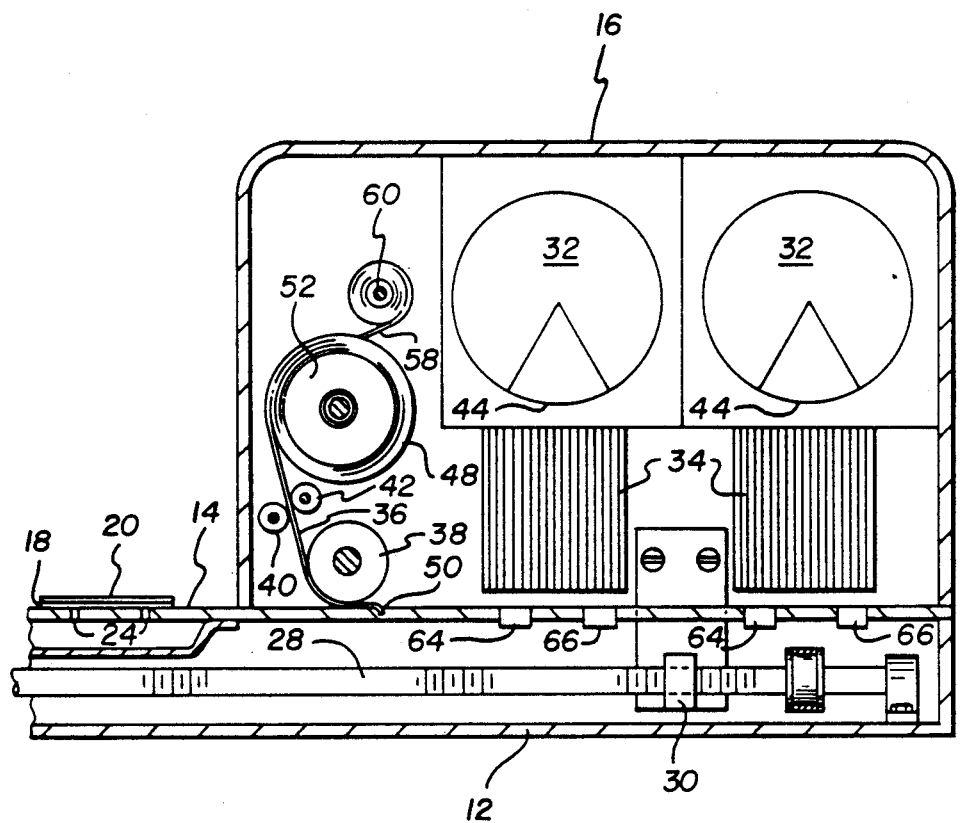
FIG. 2 is a cross-sectional view of the light trolley taken along line 2—2 of FIG. 1.
Figure 3:
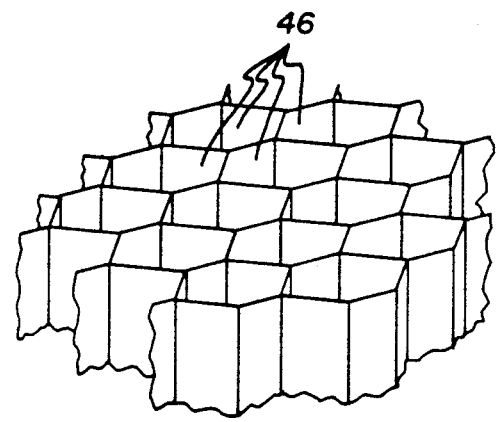
FIG. 3 is a cross-sectional view of the light collimator taken along line 3—3 of FIG. 2.
Figure 4:
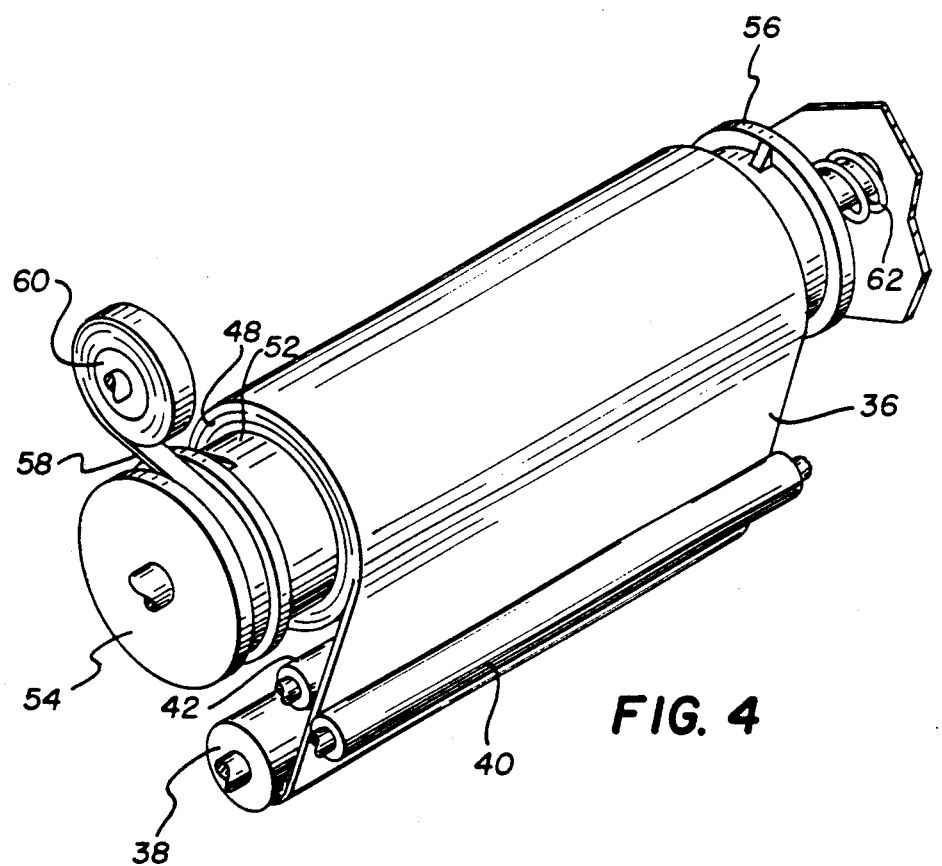
FIG. 4 is a perspective view of the cover sheet applying assembly.

Referring now to FIGS. 1 and 2, a contact printer 10 is illustrated embodying the improvement of the present invention. The contact printer comprises a platen member 12 having a planar upper surface 14 with dimensions slightly larger than the maximum dimensions of the largest original to be copied thereon. A light carriage 16, having a length approximately equal to one dimension of the platen member 12, is arranged to be moved across the platen transversely to the length of the carriage, thereby providing coverage of the entire platen during its movement.

The upper surface of the platen member 14 forms a vacuum table for the film 18 and the original 20 which are superposed thereon for exposure of the film (see FIG. 2). A rigid chamber 22, having a thickness of approximately one inch, is formed beneath the vacuum table. A plurality of vacuum ports 24 are formed in the film/original accepting portion of the surface 14 and communicate between the surface and the interior of the chamber. With the exception of the vacuum ports 24, the chamber 22 is sealed so that a vacuum pump (not shown, but normally disposed remote from the apparatus) can pull a vacuum within the chamber which is then applied, via ports 24, to the film and original which are placed on the surface 14. The ports 24 have a diameter of approximately 0.040 inch which is sufficiently large to effectively apply the vacuum to the film/original disposed on the surface 14, but is sufficiently small and the capacity of the vacuum pump is great enough that it will maintain the vacuum even though the size of the film/original is less than the maximum, leaving some of the vacuum ports uncovered. The vacuum ports outside of the area covered by the maximum size film/original are connected by shallow grooves 26 having a cross section of 0.015 inch by 0.015 inch which permit air trapped between the film/original and a cover sheet (to be further described hereinbelow) to be evacuated. It has been found that satisfactory operation can be achieved with a vacuum pump which is capable of flow rates of between 15 and 30 cfm while generating a vacuum within the chamber of between 8 and 12 inches of water.

The light carriage 16 is disposed on the upper surface of the vacuum table and is arranged to be moved across the table from a home position (the rear of the vacuum table in the example illustrated) to the opposite edge of the table, and returned to the home position. The carriage is provided with wheels (not shown) at each end thereof which ride upon tracks (not shown) provided at the lateral edges of the platen surface 14 or within the platen. The carriage is driven by a drive screw 28 within and extending the length of the platen which engages and drives a drive-nut 30 connected to the carriage. The drive screw is driven by a variable speed, reversible motor (not shown) located within the platen.

The light carriage 16 carries one or more high UV output fluorescent aperture lamps 32, with an associated mechanical light collimator 34 positioned beneath each lamp, a roll of a transparent cover sheet 36, an associated pressure roller 38, and a pair of cleaner rolls 40 and 42.

The fluorescent lamps 32 are long tubular bulbs extending the length of the carriage. The phosphors which coat the inner walls of the bulbs are selected to generate light having a wavelength in the range of 350nm to 460nm, which matches the sensitivity of the film being exposed. The bulbs have an internal reflective layer between the phosphor and the envelope glass which covers a major angular portion of the envelope wall and reflects a high percentage of the radiation striking it. A clear window 44, having an aperture of about 60° of the bulb circumference, is provided along the length of the bulb with no phosphor or reflective layer. This window produces an elongated, concentrated beam of high luminance UV light output along the length of the bulb because the reflective coating directs the major part of the bulb output through the uncoated window. The lamps are selectively oriented in the carriage with the windows 44 directed downwardly so that the beam of concentrated light is directed toward the sensitized film material 18.

It has been found that, since there is a limit to the amount of exposing energy each bulb can produce, with slower speed films the exposure times become excessively long with only one bulb. Also, the use of only one bulb reduces the dynamic exposure range available to produce such effects as spread and choke. Two bulbs provide a more stable exposing device and reduce the total time of scanning necessary for proper exposure. More than two bulbs may be used to enhance productivity by permitting faster scanning speeds for slower speed films. However, the use of additional bulbs will increase the amount of heat produced thereby, requiring the use of means to enhance the heat removal, such as a fan (not shown).

The mechanical light collimator 34 associated with each bulb comprises a plurality of parallel, fine collimator tubes 46 which are closely spaced and which transmit only substantially parallel rays of light from the fluorescent aperture lamp to the exposure plane. While the optimum tube shape for the light collimator is a cylinder, because it gives uniform image quality in all directions, it has been found that tubes having a hexagonal cross section provide a close approximation to the cylinder, yet are easier to fabricate, and provide greater useful area for light transmission as a light collimator. The inner surface of the tubes are preferrably provided with a non-reflective black coating whereby light rays which are not parallel to the tube axes are absorbed. Inasmuch as image quality is related to the solid angle of the light incident on the original/film lamination surface, based on a given distance between the sensitized film emulsion and the image of the original, the equivalent diameter of the tubes and their length are selected to extinguish incident angles of light at the exposure plane greater than a predetermined solid angle, for example a solid angle of between about 3° and about 9°. Moreover, since the illumination at the film surface depends upon the light output of the lamp and the distance of the lamp from the film surface, for a given lamp output, the shorter the length of the collimator, the greater the exposure power at the film. A preferred embodiment employs hexagonal tubes having an equivalent diameter of 0.125 inch and a length of 0.5 inch, with the bottom of the tube spaced above the film plane a distance of 0.5 inch.

The cover sheet 36 is supported as a roll 48 mounted in the carriage 16 parallel with and ahead of the fluorescent tubes (as viewed with respect to the initial travel of the carriage) and is formed of an impermeable sheet of a polymeric material, such as clear polyester, which is substantially transparent to UV radiation. The material also preferrably resists abrasion and possesses anti-static properties, or is treated to obtain these properties, so that it resists the accumulation of dust, dirt, and other materials which would adversely affect the transmission of exposing light therethrough, or which would adversely affect the collimation of the light. The outer, free end of the cover sheet is releasably connected to the vacuum table as indicated at 50. The cover sheet acts as a "vacuum lid" as it is unwound over the original/film laminate during vacuum drawdown as the carriage is moved across the vacuum table to expose the film. The cover sheet also protects the original/film laminate underneath from any abrasive action of the pressure roller 38 as it forces the cover sheet/original/film lamination into intimate contact to remove any air from the lamination which might otherwise distort the resulting exposure.

EXPOSURE CONTROL

A pair of photocells, 64 and 66, are provided for each fluorescent bulb and are disposed in the upper surface of the vacuum table under each bulb when the light carriage 16 is in the "home" position as illustrated in FIG. 2. The photocells monitor each fluorescent aperture bulb continuously when the light carriage is in home position. Each photocell collects energy over a limited bandwidth from the light source and feeds the exposure intensity level to a microprocessor (not shown). The dual system allows more accurate control over the exposure of a particular film or paper. Since the photocells can detect lamp changes and optical degradations, the microprocessor can use the information to keep the exposure levels consistent. The photocell system can also be used to indicate when maintenance is required, such as cleaning the bulbs or replacing them.

The output of each photocell is an analog voltage signal which is proportional to the intensity of the light received by the photodiode and, in the preferred example, can range from 0 to +10 volts. An input device is provided (not shown) to register the photographic speed of the film being exposed. These signals go to an analog/digital converter in the microprocessor, with the digital values being used to calculate the proper speed for the light carriage containing the fluorescent lamps across the exposure plane to provide the necessary exposure to the film. The resulting output is then used to control the light carriage drive motor speed.

OPERATION

Initially, the light carriage 16 is parked at the rear of the vacuum table 14. A sheet of film or paper 18 is positioned emulsion side-up on the platen. The longest sheet dimension is preferrably perpendicular to carriage motion to minimize the carriage travel necessary to fully cover the sheet and thus keep the time required to a minimum. The vacuum pump is activated and applies the vacuum to the film through the ports 24 to hold the film to the platen surface. The original 20, such as a color separation, is then placed on top of the film. The separation can be positioned by means of registration pins (not shown). If registration pins are used, they are located along the edge of the original/film laminate closest to the carriage home position. The type of film or paper to be exposed, or the exposure speed thereof, is entered into the machine controller. The film information and lamp intensity readings are then used to calculate the carriage traverse speed. When the "start" button is actuated, the carriage moves 16 forward toward the front edge of the platen 14 at the proper dot-for-dot exposure speed. While the carriage moves forward, the clear anti-static cover sheet 36 is unwound to cover the original/film lamination. The pressure roller 38 pushes out any remaining air from the lamination and the cover sheet is drawn into intimate contact with the lamination by the vacuum through the ports 24. The carriage continues until the "end of travel" position is reached and reverses direction to finish exposing the film and return to the home position. As the carriage returns to the home position, the cover sheet 36 is rewound on the core 52 by the constant tension spring 58, uncovering the original/film lamination after exposure for that area has been completed. It is apparent that with small film sizes, complete traverse of the platen by the carriage is not necessary. The "end of travel" position is selectable and can be specified by the user. When the carriage is back at home position, the vacuum and the lamps are shut off or placed on standby, and the film and separation can be removed.

ALTERNATIVE EMBODIMENTS

In situations where the quantity of exposure lumination is more critical than the collimation of the light at the exposure plane, it is possible to use collimation tubes which are provided with reflecting inner surfaces. Such reflective tubes would provide greater lumination at the exposure plane than the blackened tubes of the preferred embodiment, but would not provide as much collimation. Further, it is possible to construct the light carriage to permit the easy substitution of one type of collimator for another, depending upon the particular requirements at the time.

Accordingly, it will be seen that the present invention provides a contact printer which employs a short optical light path, made possible by the mechanical light collimator, which is both compact and inexpensive, and which produces substantially parallel light rays in a short distance. The use of the compact mechanical light collimator, along with the high output aperture bulbs, permits the present compact contact printer arrangement which produces the required graphic arts quality contact printing without the resultant undercutting found in devices of the prior art. Still further, the volume of space occupied by the contact printer of the present invention is substantially reduced from that required by contact printers of the prior art without increasing the risk of exposing the operator to UV radiation.

Moreover, with the arrangement of the present invention a variety of graphic art films and papers can be used without requiring extensive adjustments or modifications. Thus, the present invention provides a contact printing apparatus which is versatile in that it is easily adaptable to a wide variety of films having other spectral sensitivities, e.g. infrared-sensitive film, x-ray films, orthochromatic films, etc., such as by changing the bulbs for bulbs having the appropriate light-emitting characteristics and suitable adjustments to the apparatus control. Accordingly, the apparatus of the present invention provides a graphic arts contact printer which would easily fit into the production environment, providing high productivity, high quality images, adaptability, compact size, and low cost.

The invention has been described with reference to specific embodiments and variations, but it should be apparent that other modifications and variations can be made within the spirit and scope of the invention, which is defined by the following claims.

We claim:

1. In a contact printer comprising means for supporting a film and an original in superposed relationship, means for providing a source of light for exposing said film through said original, and means for moving said light over the surface of said superposed film and original, the improvement comprising means carried by said light moving means for collimating said light, said light collimating means comprising a plurality of parallel tubular members having a length to diameter ratio greater than about four and extending between said light source and said film.

2. A contact printer according to claim 1 wherein said tubular members have a substantially circular cross section.

3. A contact printer according to claim 1 wherein said tubular members have a substantially hexagonal cross section.

4. A contact printer according to claim 1 wherein said tubular members are closely spaced with substantially no spacing between adjacent tubular members.

5. A contact printer according to claim 1 wherein said tubular members are arranged with the axes thereof disposed substantially perpendicular with said film and said light source.

6. A contact printer according to claim 1 wherein said tubular members have a reflective inner surface.

7. A contact printer according to claim 1 wherein said tubular members have a light absorptive inner surface.

8. In a contact printer comprising vacuum table means for supporting a photosensitive film and an original containing an image to be reproduced in superposed relationship, light means for providing an elongated beam of photoactive light for exposing said film through said original, means for moving said light means transversely of the length of said beam over said vacuum table surface over said superposed film and original whereby said superposed film and original are scanned by said light so that light exposes said film through said original, the improvement comprising means carried by said light moving means for collimating the light from said light means, said light collimating means comprising a plurality of parallel tubular members having a length to diameter ratio greater than about four and extending between said light source and said film.

9. A contact printer according to claim 8 wherein said tubular members have a substantially circular cross section.

10. A contact printer according to claim 8 wherein said tubular members have a substantially hexagonal cross section.

11. A contact printer according to claim 8 wherein said tubular members are closely spaced with substantially no spacing between adjacent tubular members.

12. A contact printer according to claim 8 wherein said tubular members are arranged with the axes thereof disposed substantially perpendicular with said film and said light source.

13. A contact printer according to claim 8 wherein said tubular members have a reflective inner surface.

14. A contact printer according to claim 8 wherein said tubular members have an absorptive inner surface.

15. In a contact printer comprising vacuum table means for supporting a photosensitive film and an original containing an image to be reproduced in superposed relationship, light means for providing an elongated beam of photoactive light for exposing said film through said original, means for moving said light means transversely of the length of said beam over said vacuum table surface over said superposed film and original whereby said superposed film and original are scanned by said light so that light exposes said film through said original, the improvement comprising means carried by said light moving means for collimating the light from said light means, said light collimating means comprising a plurality of parallel tubular members having a length to diameter ratio greater than about four and extending between said light source and said film, said tubular members being arranged with the axes thereof disposed substantially perpendicular with said film and said light source, said tubular members having a substantially hexagonal cross section and a light absorptive inner surface whereby unorganized light introduced into one end thereof leaves the opposite end substantially collimated.

16. A contact printer according to claim 15 wherein said light collimator is readily replaceable.

* * * * *